July 15, 1958 — H. ORNER — 2,842,978
BALL BEARING SCREW AND NUT MECHANISM
Filed Jan. 16, 1956
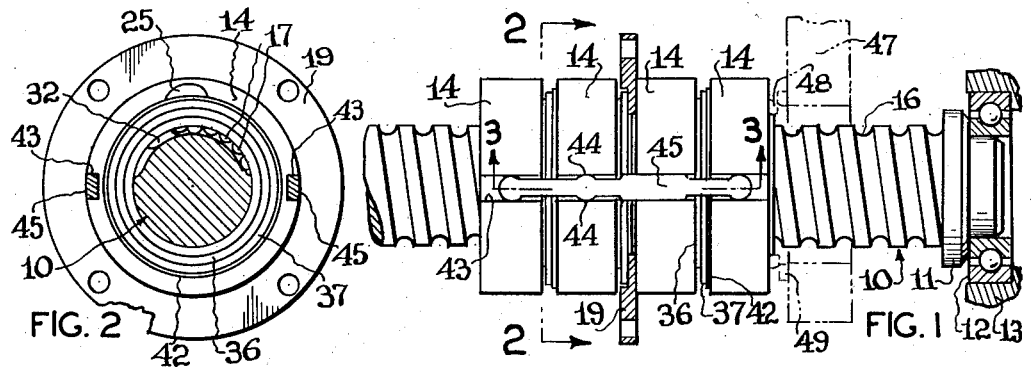
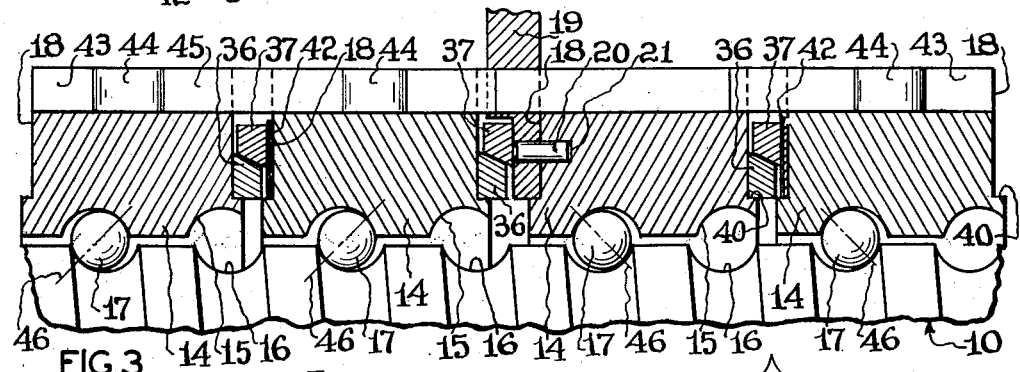
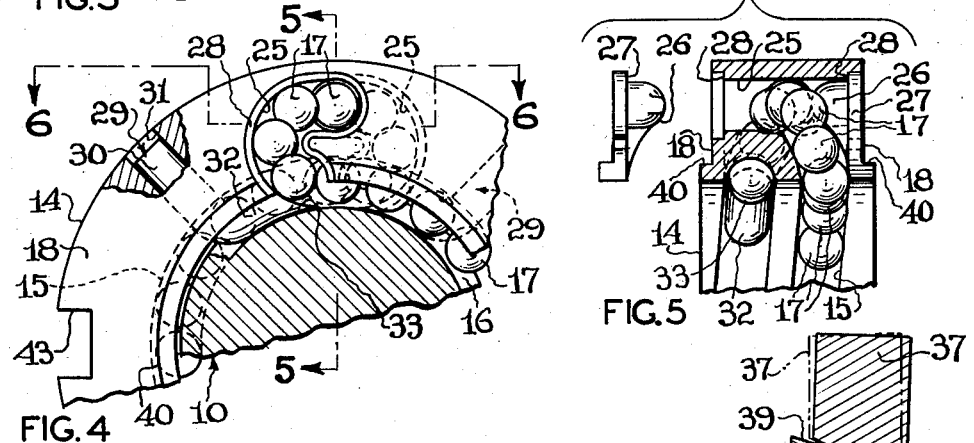
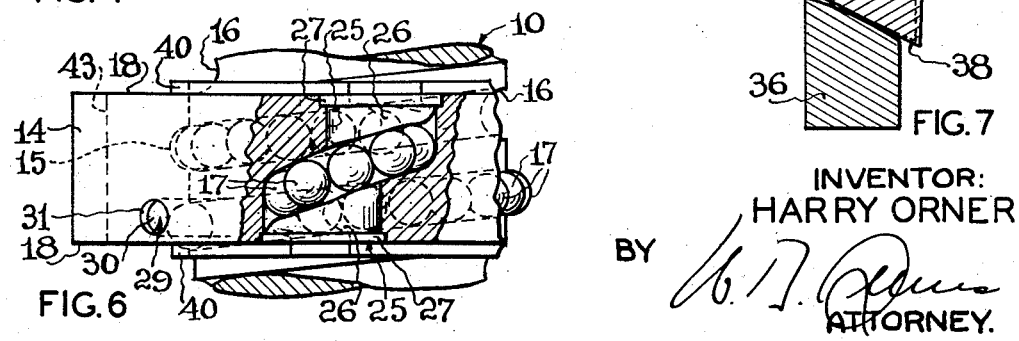
INVENTOR:
HARRY ORNER United States Patent Office 2,842,978
Patented July 15, 1958

2,842,978

BALL BEARING SCREW AND NUT MECHANISM

Harry Orner, Altadena, Calif.

Application January 16, 1956, Serial No. 559,283

28 Claims. (Cl. 74—459)

This invention relates to ball bearing screw and nut mechanisms, and more particularly to a new and improved construction in which the bearing elements may be resiliently preloaded and to a ball race loop design featuring a ball return loop formed directly in the nut material.

Ball bearing screw and nut mechanisms are widely used for the purpose of transforming rotary motion to linear motion and vice-versa. Certain of these mechanisms conventionally comprise a multiple-turn helical ball race between the screw and the nut, and an external return for the balls from one end of the ball race to the other. Another type employs a single turn race between the screw and the nut, and a ball-return loop formed by a specially contoured insert mounted crosswise of the nut. Both types are subject to certain disadvantages which are overcome by the improved construction provided by the present invention.

For example, in the multiple-turn ball race design the load is seldom distributed uniformly causing unequal stress and strain in the respective race grooves of the screw and nut. Factors adversely affecting load distribution include unequal temperature conditions in different parts of the mechanism, longitudinal or torsional bending, creep and relief of internal stresses, and others. In the single turn race design employing an insert in the nut structure and formed as to transfer the balls between the opposite ends of the load bearing groove, the balls must pass across the mating edges of the insert and the nut body while under load. As a result the corners of these mating edges are subject to early failure under operating conditions.

The present invention includes certain features related to those disclosed and claimed in my co-pending applications for United States Letters Patent Serial No. 371,253, filed July 30, 1953, and Serial No. 459,605 filed October 1, 1954, each being entitled "Ball Bearing Screw and Nut Mechanism." The construction shown in the last-mentioned of these applications avoids failure due to breakdown at the junction of the nut body with the return loop insert by providing a split nut construction requiring no insert. Moreover the planes of the mating faces of the nut are selected to meet along the axis of the return race loop rather than in a portion of the load-bearing groove where the mating edges would be traversed by balls under load. While the construction of the co-pending application No. 459,605 possesses certain important advantages, it does not have a load or working groove of 360 degrees, and the entrance and exit ends of the return loop merge with the ends of the working groove at a relatively sharp angle.

The ball-bearing screw and nut mechanism of the present invention not only eliminates the need for a ball-return insert but provides a one-piece nut having a ball-return passage formed directly therein. Additionally, the angular change in the direction of ball movement in passing between the load and return grooves in the design according to this invention is substantially smaller and involves reduced losses in effecting the transfer of balls between the ends of the load groove.

My co-pending application, Serial No. 371,253, shows two embodiments of a ball-bearing nut mechanism having provision for axially preloading the balls operating in a closed circuit between a screw and nut assembly, and incorporating certain principles employed in a substantially improved manner in the design herein disclosed. For example, the present invention comprises a pair of nesting high-strength preloading rings having contoured mating surfaces which converge toward the axis of the rings at an angle greater than the critical angle of friction. In consequence, the application of an axial load to a set of the rings positioned between the faces of adjacent nuts reacts resiliently to force the nuts axially apart to preload the balls in the load groove of each. If one of the mating surfaces of the rings is rounded, as preferred, it will be evident that the other ring can tilt more readily through the slight angle required to permit uniform distribution of the load between the balls and the raceway grooves. According to one specific mode of utilizing the advantages of these principles, the energy-storing nesting rings are placed under a predetermined axial load between the adjacent faces of two nuts of a ball-bearing screw and nut mechanism and serve to preload the balls of each nut resiliently from stresses stored within the springs. These preloading stresses are uniformly distributed to the balls and completely eliminate backlash and end play.

It is a primary object of the present invention to provide a ball-bearing screw and nut mechanism incorporating improved preloading means for assuring uniform distribution of the preload forces on the balls between the nut and the screw.

Another object is the provision of a ball-bearing screw and nut mechanism incorporating a novel axially-acting resilient preloading device positioned between a pair of ball-bearing nuts and effective to maintain a closed-circuit series of balls located between each nut and a cooperating screw under a desired preload pressure.

Yet another object of this invention is to provide a ball-bearing screw and nut assembly having a screw mounting a plurality of nuts each cooperating with the helical screw groove to form independent closed-circuit ball raceways of figure eight configuration in each of which the load-bearing portion of the circuit includes at least one full convolution of the screw.

Still another object of this invention is to provide a nut for a ball-bearing screw and nut assembly having a ball-return loop formed directly in the nut body by passages cut from the opposite radial faces of the nut.

More specifically, it is an object of the invention to provide a nut for a ball-bearing screw and nut assembly having a ball-return loop formed by the body of the the nut with its ends extending in opposite directions and positioned to merge with the ends of a full convolution of a load groove formed between the nut and a screw passing therethrough.

Yet another object of the invention is to provide a ball-bearing screw and nut assembly having a plurality of nuts each of which cooperates with a portion of the groove of a screw to form independent closed circuits for balls, together with means for distributing an externally applied load from nut to nut, and to the balls in the load grooves.

It is an object of this present invention to provide an improved ball-bearing nut assembly on a ball-bearing screw that distributes the load from nut section to nut section in the assembly and proportionally on the balls in at least a full turn on the nut section body.

A further object of this invention is to provide a ball-bearing nut assembly on a ball-bearing screw of a plurality of nut sections of independent ball-bearing circuits, each of at least one full turn in the body of the nut section, to position the nut sections relative to the balls in contact with the load grooves.

A further object of this invention is to provide a ball-bearing nut assembly on a ball-bearing screw of a plurality of independent ball-bearing circuits each of at least one full turn that can be assembled to distribute the load from nut section to nut section both in desired magnitude and direction under a spring load.

Another object of this invention is to provide a ball-bearing return means to guide the balls over the screw thread crest in the form of a loop to form a load groove in the nut section of at least a full turn without the balls leaving the unitary nut section.

Another object of this invention is to provide a ball-bearing nut assembly on a ball-bearing screw, to distribute the load on the balls for at least one full turn from nut section to nut section to control the load on each nut during the assembling and the self-aligning of the nuts on the screw relative to the balls therebetween.

Another object of this invention is to provide a ball-bearing nut assembly on a screw to distribute the load on the balls in the nut load groove and in the screw load groove from nut to nut, to preload at least two nuts in opposite directions under spring force to take out all end play.

Another object of this invention is to provide an articular ball-bearing nut assembly on a ball-bearing screw to adjust itself in load distribution on the balls.

Still another object of the invention is to provide a resilient preloading device comprising a pair of nesting rings having contacting rims which converge in the same direction at an angle greater than the critical angle of friction and adapted to be compressed between axially arranged annular members to urge the same apart by energy stored in said nested rings.

These and other objects and advantages of the invention will be more fully set forth in the following specification and claims considered in connection with the attached drawing to which they relate.

In the drawing:

Figure 1 is a side elevational view, partly in longitudinal section, of the improved ball-bearing nut and screw assembly;

Figure 2 is a cross-sectional view taken on line 2—2 of Figure 1;

Figure 3 is a fragmentary longitudinal sectional view taken on line 3—3 of Figure 2 through the multiple nut section of the assembly showing the position of parts with the balls preloaded in opposite directions;

Figure 4 is a fragmentary cross-sectional view through the assembly showing the cover assembly for the ball-return loop removed and portions of the nut broken away to show the manner of anchoring the ball pick-up;

Figure 5 is a partial cross-sectional view taken on line 5—5 of Figure 4, and shows one cover for the ball-return loop in position for assembly on the side of the nut;

Figure 6 is a fragmentary sectional view taken on broken line 6—6 of Figure 4 and shows certain details of the ball-return loop; and Figure 7 is a radial sectional view through the nested self-aligning preloading ring assembly under axial compression and indicating by dot and dash line the manner in which the outer ring may tilt relative to the plane of the inner ring.

Referring to the drawing, and particularly to Figure 1, the mechanism is shown as comprising a screw 10 having at one end a flanged collar 11 journaled in a suitable bearing 12 carried by a support 13. Mounted on screw 10 are a plurality, here shown as four, of identical nut or nut sections 14 each having an inwardly facing groove or raceway 15 extending helically and having the same pitch as a similarly shaped helical groove or raceway 16 formed along the exterior of screw 10. Each cooperating pair of raceways 15 and 16 form load-bearing or working grooves for a series of ball bearings 17.

As best shown in Figures 1 and 2, each nut section is provided with an annular shoulder 18 on its radial face, the shoulder in the second nut section from the right section seating a load-transmitting ring 19 anchored to ring 14 by one or more axially extending pins 20 seated in openings 21 of the nut.

Each of the substantially identical nuts 14 is provided with a ball-return loop of circular cross section generally designated 25 and formed directly in the body of each nut, and having a substantially helical direction of advance opposite to that of the load groove as best shown in Figures 4, 5 and 6. It will be understood the return loop is a complete convolution of slightly elliptical shape as viewed from the side, and that its opposite ends merge tangentially with the opposite ends of a complete convolution of the load groove 15, 16. It will also be noted by reference to Figure 6 that the axial length of the ball-return groove 25 is the same as the axial length of each load groove.

Ball-return groove 25 is preferably formed by moving the spherical end of a milling cutter in an arc of 180° or more outwardly from one terminal end of groove 15 and generally toward the outer periphery of the nut section 14, the cut increasing in depth as the cutter advances. The nut is then turned over and a similar cut is made from the opposite face in such manner that one end of the second cut merges with one end of the first cut.

The groove 25 is, as a result of its method of formation, open for one-half of its length to each of the radial faces of the nut. The openings in the nut side walls are closed and the open sides of the loop race are closed by contoured surfaces 26 on the arcuate cover plates 27 the rim edges of which are shaped to seat upon similarly shaped shoulders 28 encircling the openings in the radial faces of the nut. Cover plates 27 may be secured in place in any suitable manner as by brazing, soldering or the like.

Suitable pick-up devices for transferring the balls between the load and ball-return grooves are shown in Figure 4 as comprising a pair of generally L-shaped members 29 of circular cross section each having one leg 30 extending into a radial bore 31 opening into groove 15. The shorter leg 32 of pick-up device 29 extends into the race formed by nut groove 15 and screw groove 16, its arcuately contoured end 33 merging tangentially with the bottom of groove 16 and smoothly with the adjacent end portions of the ball-return groove 25 in nut 14.

Referring now to Figures 3 and 7, the self-aligning and resilient preloading device for the ball-bearing assembly will be seen to comprise nested inner and outer high-strength metal rings 36 and 37 having opposed adjacent rim edges. Tapered inner rim 38 of outer ring 37 may be frustoconical, while the abutting outer rim edge 39 of inner ring 36 preferably lies in the surface of a sphere. It is important that the rim surfaces 38 and 39 in contact with one another converge in the same direction at an angle somewhat greater than the critical angle of friction of the material from which the rings are made, a value of 15 degrees or greater generally being suitable. When one rim surface is part of a spherical surface, as is preferred, the angle of contact determines the critical angle of friction and this angle lies between the ring axis and a line normal to a radius line through a point of contact between surfaces 38 and 39.

As is illustrated in Figure 3 a pair of the nested rings 36 and 37 is positioned between the radial faces of adjacent nut sections 14, an annular shoulder 40 being formed on the right-hand side of each nut to seat the inner corner of ring 36. The annular shoulder 18 on the opposite radial face of each nut section, excepting only the nut section second from the right in Figure 3, serves to position one or more spacing shims 42 as may be necessary to obtain a desired preload stressing of the balls 26 in a given nut and screw assembly upon the use of particular pairs of preload rings 36, 37.

The preloading of the assembly is accomplished in a manner later described but to retain the nut sections in their adjusted positions so as to maintain the preload there are provided lock means comprising axial slots 43 in the peripheral surface of each nut section and locking keys 45. Each key 45 is of sufficient length as to extend axially across the various compensating nut sections and is sized to fit within the slot 43, its rounded spaced enlargements 44 contacting the sides of the slot.

Assembly of the mechanism

In the assembly of the screw and nut mechanism comprising the present invention the nut sections 14 are individually inserted over the end of the screw 10 and the ball circuit of each is filled with balls 17 through one open side of the ball-return loop from which the cover 27 is displaced. The cover plate is then secured in place and one or more shims 42 of appropriate thickness are seated on the shoulder 18 of the first nut section and thereafter a pair of preloading and self-alignings rings 36 and 37 are positioned adjacent the shims. The remaining nut sections are assembled in the same manner except that a load transmitting ring 19 is seated on shoulder 18 of one of the nuts, the second from the right in the illustrated form, in lieu of the shims. At this stage of the assembly, slots 43 of the nut sections will be in echelon since the adjacent nut sections have not been rotated toward one another to compress the nested rings to bring the slots into axial alignment.

The next step is to forcibly rotate adjacent nuts in opposite directions to the extent required to bring slot or slots 43 of each nut into alignment to receive locking key or keys 45. If it is desired to preload the balls of the end of pairs of nuts in generally opposite directions, as has been done in the assembly illustrated in Figure 3, the two center nuts are first rotated together to bring their slots 43 into alignment and so held while the end nuts are similarly rotated oppositely to bring all slots into alignment. Keys 45 are then pressed into the slots to complete the assembly and preloading of the balls.

It will be understood that the forcible rotation of adjacent nuts toward a transverse median plane acts to compress the nested rings 36 and 37 as well as to place all balls in the load grooves under transverse pressure along axes 46 inclined to the screw axis. Due to the convergence of ring surfaces 38 and 39 the inner ring is placed in hoop compression and the outer ring in hoop tension and, the angle of contact between these converging surfaces being greater than the critical angle of friction, the relatively high magnitude stresses present are readily releasable to the nut sections. In fact, the preloading capabilities of the rings 36, 37 are limited only by their cross sectional areas and the yield strength of the material used. It is even feasible to compress them axially during assembly by the use of thicker shims until the yield strength is exceeded, care being exercised not to stress them to their ultimate strength. Another important aspect of the preloading rings is their ability, by virtue of the spherical contour to converging surface 39, to tilt relative to one another to the extent required to distribute the preloading stresses uniformly between the balls in adjacent load grooves and compensate for bending of the screw, tolerance variations and other variable factors. Another highly important aspect of the preloading feature of the described construction is the positive elimination of backlash irrespective of whether or not an external load is being applied to the assembly.

It is also feasible to preload the balls of a multiple nut assembly in various other ways other than that described above and illustrated in Figure 3. For example the preloading operation may be carried out in such manner that the axes 46 of preload stress through all balls of all four nuts are inclined in the same direction. This is preferably done by the use of a temporary split collar 47 and a pair of temporary preloading rings 48, 49 identical in design to the nesting preload rings 36 and 37, the three temporary parts 47, 48, 49 being shown by dot and dash lines in Figure 1. Ring 48 has an inner diameter suitable for support on the shoulder 40 of the right-hand nut 14. First making certain that the screw 10 is anchored against axial or rotary movement and that temporary support collar 47 is similarly anchored, the adjacent nut 14 is rotated toward the right to compress rings 48, 49 by a predetermined torque force which is known to stress the rings 48 and 49 to a point preferably approaching their yield strength. During this operation the nut may shift in a plane crosswise of screw 10 as permitted by the spherical surface of ring 48 in contact with the frustoconical surface of ring 49 thereby bringing the opposed portions of working grooves 15 and 16 into true alignment and permitting uniform distribution of the load on the balls therebetween.

The second ring from the right is then rotated in the same direction against the first nut until slots 43 are in alignment while the torque load is maintained constant on the first ring. The same procedure is followed with respect to the third and fourth nuts until all of the slots 43 are in accurate alignment with one another permitting keys 45 to be pressed into seating retaining relationship. The torque loads imposed upon the respective nuts may now be removed along with the temporary assembly collar 47 and the temporary self-aligning preload rings 48, 49, leaving the balls of each nut ring preloaded along axes 46 all of which are inclined in the same direction relative to the screw axis and so maintained by the stresses stored in rings 36, 37.

The preload stress may be varied by substituting shims 42 of different thicknesses between ring 37 and the face of the adjacent nut as this will vary the axial nesting of the preloading rings and consequently the amount of energy stored therein in bringing slots 43 of the nuts into alignment for reception of locking key 45. For example, a thicker shim requires that rings 36 and 37 be placed under greater hoop stresses when the nuts are rotated to bring the key slots 43 into alignment whereas a thinner shim will require that the rings be stressed to a lesser degree. Accordingly, the selection of the shims in combination with the nesting rings provides a convenient method of controlling the effective preloading values of the rings.

The cross-sectional areas of the resilient preloading rings 36 and 37 should be adequate to withstand the hoop stresses imposed in bringing slots 43 of the nuts into alignment without yielding although slight yielding is permissible since ring 37 stretches slightly until the hoop tension exceeds the elastic limit of the material which then takes a permanent set. Due to this characteristic of the preload rings, it is feasible to bring slots 43 of the nuts into alignment without using shims 42.

So long as the balls are preloaded in the manner of this invention it will be understood that there can be no backlash or play between the nut and the screw irrespective of whether an external load is acting between the nut and screw. Accordingly, the application of a load force to either the screw or nut assembly is instantly effective to effect relative movement of the member of the assembly intended to be driven by the applied force. Each ball-bearing and nut section has a rated load depending on the size of the screw and nut and the number of balls therebetween, and a single pair of nut sections preloaded as described may meet a particular load requirement. If this is not the case, additional nut sections 14 may be added to either side of the first pair and preloaded there-against until the load requirements of the assembly are fulfilled, a longer key 45 being substituted to extend through the aligned slots 43 of the larger number of nut rings.

Under operating conditions in which a single nut ring is adequate to carry the load, the advantages of self-alignment provided by the resilient preloading rings 36 and 37 may be realized merely by positioning a pair of the nested rings between the external load-applying ring 19 and the radial face of the nut ring and suitably coupling the ring 19 to the nut as by interlocking pins and bores 20, 21. The identical individual nut sections have independent recirculating ball systems designed for manufacture efficiently by mass production methods. Although the ball-return grooves 25 have been described as formed by milling, it is to be understood that they can be formed by other techniques including casting by the "lost-wax" method. The insert plug 26 and integral cover 27 may also be cast.

While the particular ball-bearing nut and screw assembly herein shown and described in detail is fully capable of obtaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. An antifriction self-aligning bearing assembly comprising, a pair of inner and outer concentrically-arranged circular raceway members having a pair of opposed raceway surfaces therebetween, a plurality of antifriction bearing elements distributed circumferentially along and between said raceways, load transmitting means for imposing a load on said circular members from opposite directions axially of said assembly including a load-transmitting member and a pair of nesting rings interposed between one of said circular raceway members and said load-transmitting member, one of said rings having a rounded rim edge nested against a tapering rim edge of the second ring and cooperating therewith to provide a self-aligning load-transmitting assembly adapted to be disposed between one of said circular raceway members and said load-transmitting member.

2. An antifriction self-aligning bearing assembly comprising, a pair of inner and outer concentrically-arranged circular raceway members having a pair of opposed raceway surfaces therebetween, a plurality of antifriction bearing elements distributed circumferentially along and between said raceways, axially-expansive preloading means positioned between said circular members including a pair of partially nested annular means, the contacting rim edges of said nested annular means having surfaces converging toward the axes thereof at an angle greater than the critical angle of friction and having such relative diameters that the outer one of said annular means nests partially around the inner one of said annular means prior to being placed under axial load, whereby the application of axial loading forces tending to nest said annular means together places at least one of said annular means under hoop strain.

3. An antifriction self-aligning bearing assembly as defined in claim 2 wherein one of the nesting rim edges of said annular means has a rounded contour to form a spherical seating surface for the juxtaposed rim edge of the other annular means thereby permitting the planes of said annular means to tilt slightly relative to one another to distribute the load evenly between said raceway members and the bearing elements therebetween.

4. A pair of antifriction bearing assemblies comprising an inner cylindrical member having axially spaced outwardly-facing raceways, a pair of outer annular members surrounding said inner member each having an inwardly facing raceway opposite one of said outwardly facing raceways, a plurality of antifriction bearing elements arranged in two rows between each pair of said oppositely facing raceways, a pair of nesting rings located between one of said pair of outer raceway members, the nesting rim edges of said rings having surfaces converging toward the axes thereof at an angle greater than the critical angle of friction, and the respective diameters of said converging surfaces being such that the rings nest only partially as assembled, whereby the application of opposed axial forces on said outer raceway members acts to load the same by placing at least one of said nested rings in hoop strain.

5. An antifriction bearing assembly as defined in claim 4 wherein the nested rim of one of said nesting rings is rounded crosswise thereof to provide a spherical surface of limited width for the seating of the juxtaposed rim edge of the other ring.

6. An antifriction bearing assembly as defined in claim 4 wherein said raceways are arranged helically about the common axis thereof, the surfaces of said raceways being substantially arcuate in cross section, and said antifriction bearing elements being spherical.

7. An antifriction bearing assembly as defined in claim 6 wherein said outer raceway members are adapted to be rotated toward one another to force said nested rings axially together thereby placing at least one thereof in hoop strain, and means for locking said outer raceway members in a predetermined rotated position wherein said stressed nested rings are effective to preload said antifriction bearing elements resiliently with energy stored within the bearing assembly.

8. In a ball-bearing screw and nut assembly of the type having a nut held assembled about a screw by an endless series of balls located in helical grooves between said nut and screw, that improvement comprising a ball-return loop groove formed directly in the nut material and having a pair of ends merging tangentially with the opposite ends of a full-turn load loop groove formed between said nut and screw, said ball-return groove and said load groove having their axes substantially parallel to one another and cooperating to form an endless figure-eight circuit for balls, said return groove having separate halves thereof opening laterally through the opposite faces of said nut, and cover plate means closing said lateral openings to the ball-return groove.

9. A ball-bearing screw and nut assembly as defined in claim 8 wherein the interior face of said cover plate means has a contoured surface cooperating with opposed surfaces of said loop ball-return groove to provide a curvilinear continuity passage.

10. A ball-bearing screw and nut assembly as defined in claim 8 including ball pick-up means carried by said nut and providing smooth arcuate extensions of said ball-return groove at the junctions thereof with said load groove.

11. A ball-bearing screw and nut assembly comprising, a plurality of identical helically grooved nuts arranged axially along a helically grooved screw and held assembled thereto by independent rings of balls seated between said grooves, resilient means interposed between the radial faces of adjacent nuts comprising a pair of partially nested rings each bearing against a different one of said nuts, one of the nesting rim edges of said rings having a spherical surface in contact with the tapering rim edge of the other ring whereby one ring may tilt slightly relative to the other to effect uniform load distribution between the balls in the load groove of each nut as said nuts are axially loaded toward one another.

12. A ball-bearing screw and nut assembly as defined in claim 11 including means for locking adjacent nuts in a predetermined axial position to hold said nested rings axially compressed thereby placing the outer one thereof in hoop tension and the inner one in hoop compression, and the angle of contact between the nested rims of said rings being greater than the critical angle of friction whereby the energy stored in the stressed rings is releasable.

13. A ball-bearing screw and nut assembly comprising a plurality of nut sections each having a ball-return loop within its body merging with the opposite ends of a load groove convolution extending helically about its inner periphery, said nuts being held assembled axially along a helically grooved screw by independent endless series of balls filling each pair of said ball-return loops and load grooves, and resilient preloading means positioned between the facing ends of adjacent nuts effective to force said nuts axially apart with a predetermined force and to distribute said force between the balls in the respective load convolutions by permitting limited tilting of said nuts relative to one another.

14. A ball-bearing screw and nut assembly as defined in claim 13 wherein said resilient preloading means comprises a pair of partially nested rings adapted to be stressed as adjacent nut rings are rotated toward one another along said screw, and means for holding said nut rings rotated together sufficiently to compress said nesting rings together and preload said balls with a predetermined load.

15. A ball-bearing screw and nut assembly as defined in claim 13 wherein said resilient preloading means comprises a pair of partially nested rings the contacting axial edges of which converge toward the axes of said rings at an angle in excess of the critical angle of friction whereby the forced nesting of the same places the inner ring under hoop compression and the outer one under hoop tension, and key means adapted to lock a plurality of axially spaced nut rings forcibly rotated against the nested rings therebetween whereby the energy so stored in said rings reacts axially in opposite directions through said nut rings to place said balls under load against the convolutions of said screw.

16. A preloaded, self-aligning ball-bearing nut and screw assembly comprising, a helically grooved screw, a plurality of nut sections having internal helical grooves spaced along said screw and held assembled thereto by an independent endless ring of recirculating balls between each nut and the screw, a pair of nesting preload rings locked compressively between the opposed faces of adjacent nut sections, the contacting nesting rims of said preload rings converging toward the axes of said rings at different angles in excess of the critical angle of friction, whereby one nut section and its associated preload ring may tilt slightly with respect to the other nut section and preload ring to distribute the preloading stresses stored within the axially compressed preload rings uniformly to the balls between the screw and the nuts.

17. A preloaded, self-aligning ball-bearing nut and screw assembly as defined in claim 16 including a ball-return passage formed directly in the material of each nut and having the respective ends thereof merging tangentially with at least a full convolution of the separate helical ball-filled passages between said screw and each of said nuts.

18. A preloaded, self-aligning ball-bearing nut and screw assembly as defined in claim 17 including a pick-up device carried by each merging junction of the ball-return passages with the helical grooves between the screw and the nuts, said pick-up device having an arcuate surface providing a smooth transfer path for the balls to and from the ball-return passages.

19. In a ball-bearing nut and screw assembly of the type having a helically grooved screw for balls, a plurality of recirculating ball-type nuts arranged along the screw, each of said nuts having an independent endless series of circulating balls holding it assembled to said helical groove; that improvement which comprises means for constraining said nuts to rotate in unison and free of backlash relative to said screw groove, said means including a two-part resilient self-aligning device positioned between adjacent faces of said nuts, and means holding said nuts rotated against said two-part resilient device with the balls of each series compressed between opposing portions of the nut and screw grooves.

20. In a ball-bearing nut and screw assembly as defined in claim 19 including shim means positioned between said resilient self-aligning device and the adjacent face of a nut, the effective pressure on said balls imposed by said resilient device depending on the thickness of the shim means selected for use.

21. In a ball-bearing nut and screw assembly as defined in claim 19 wherein said resilient self-aligning device comprises a pair of nesting rings of uniform cross section having contacting rim surfaces converging toward the axes of said rings, the inner ring being in hoop compression and the outer in hoop tension, said hoop stresses being effective to urge said nuts axially apart to press said balls against the screw groove under pressure proportional to the magnitude of the hoop stresses stored in said rings as said nuts are held against rotation away from each other.

22. A ball-bearing screw and nut mechanism comprising a screw having an external helical groove, a plurality of independent nut elements each having an internal helical groove, said screw groove mating with each nut groove to form independent full turn-load convolutions, a single ball-return convolution in each nut element for each load convolution, said ball-return convolution comprising a loop groove formed partially from the opposite sides of the nut and having its ends merging with the extreme ends of an associated load convolution, cover means for the outer radial faces of said ball-return convolutions, the ball-return convolution and the load convolution of each nut forming a continuous ball passage having a figure-eight configuration, a pick-up structure at the junctions of said ball-return and load convolutions, said pick-up being fixed in said nut and extending into the load convolution and having an arcuate ball race surface, a plurality of balls under compressive stress throughout each load convolution, a pair of preloading and self-aligning rings between adjacent nuts including an internal ring and an external ring of predetermined cross sectional area, said internal ring having an external spherical working surface, said external ring having an internal inclined working surface co-acting with said spherical working surface at an angle greater than the critical angle of friction to prevent binding therein and to permit angular movement of said self-aligning rings relative to one another and to maintain said balls under a uniformly distributed compressive load throughout said load convolutions.

23. A ball-bearing nut for use on a screw member of the type having a helical thread groove therealong of arcuate shape in cross-section for seating ball-bearings, said nut comprising a ring having an inwardly opening helical groove formed along its inner cylindrical surface, said groove being of arcuate cross-sectional shape to seat ball-bearings and adapted to cooperate with the similarly shaped groove of a screw member to form a complemental loading-bearing raceway of at least one full turn, said nut having a ball return loop merging tangentially with the opposite ends of said full turn load groove and having an axis substantially parallel to the axis of said nut, and the opposite sides of said ball return loop being accessible from the opposite faces of said nut.

24. A ball-bearing nut for use on a screw member of the type having a helical thread groove therealong of arcuate shape in cross-section and adapted to seat ball bearings therein, said nut comprising a castable ring, said ring having on its inner cylindrical surface an inwardly opening helical groove of arcuate cross-section providing a single full turn load loop groove adapted to provide a raceway for a series of ball-bearings, said nut having formed within the body thereof a small substantially helical ball return loop groove the opposite ends of which merge tangentially with the opposite ends of said load loop groove, said return loop groove opening laterally through the opposite side faces of said nut, and means for closing the opposite side faces of said return loop groove to prevent escape of ball bearings after the assembly of the nut to a cooperating screw member.

25. A ball bearing nut as defined in claim 24 having an opening extending transversely thereof and adapted to seat a keeper bar when a plurality of similar ones of said nuts are assembled on a common screw member.

26. A ball bearing nut as defined in claim 24 wherein at least one side face thereof is formed with means being adapted to seat and retain concentrically centered relative to said nut resilient means capable of resisting an axial load.

27. A ball-bearing screw and nut assembly comprising a plurality of nut sections each having a spiral groove interiorly thereof, a helically grooved screw adapted to extend through said nut sections and cooperating therewith to provide helical mating load convolutions for independent series of balls arranged in separate ball circuits at least one of which circuits is associated with each of said nut sections, and resilient preloading means positioned between the facing ends of adjacent nut sections effective to force said sections axially apart with a predetermined force and to distribute said force between the balls in the respective load convolutions by permitting limited tilting of said nut sections relative to one another.

28. A ball-bearing screw and nut assembly comprising a plurality of nut sections each having a ball return loop merging with the opposite ends of a load groove convolution extending helically about its inner periphery, said nuts being held assembled axially along a helically grooved screw by independent endless series of balls filling each pair of said ball return loops and load grooves, and means including resilient preloading means so positioned with respect to the end faces of the nut sections as to force said nuts axially with a predetermined force to distribute said force between the balls in the respective load convolutions by permitting limited tilting of said nuts relative to one another.

References Cited in the file of this patent

UNITED STATES PATENTS 2,674,899     Gobereau _____ Apr. 13, 1954